Feb. 21, 1939.   H. A. SATTERLEE   2,147,674
APPARATUS FOR CONTROLLING ROTATION
Filed March 15, 1938   2 Sheets-Sheet 1

INVENTOR.
HOWARD A. SATTERLEE
BY
ATTORNEY

Feb. 21, 1939.  H. A. SATTERLEE  2,147,674
APPARATUS FOR CONTROLLING ROTATION
Filed March 15, 1938   2 Sheets-Sheet 2

INVENTOR.
HOWARD A. SATTERLEE
BY
ATTORNEY

Patented Feb. 21, 1939

2,147,674

UNITED STATES PATENT OFFICE 2,147,674

APPARATUS FOR CONTROLLING ROTATION

Howard A. Satterlee, Needham, Mass., assignor to Submarine Signal Company, Boston, Mass., a corporation of Maine Application March 15, 1938, Serial No. 196,014

12 Claims. (Cl. 172—179)

The present invention relates to a system for controlling rotation. More particularly the present invention relates to a system for moving by means of a motor a certain device into a desired position at any desired speed.

In my copending application Serial No. 108,853, filed November 2, 1936, I have disclosed a variable speed motor operating system which is also adapted to control the rotation or movement of a device into a desired position from a remote point. Briefly stated, that system employs a motor having an armature immersed in a continuous magnetic field and adapted to generate a back E. M. F. when in motion, the armature being in series with the anode circuit of a grid-controlled rectifier supplied with an alternating anode potential and with a uni-directional grid potential variable in accordance with the desired motion of the remote body and opposed by the motor back E. M. F. whereby the speed of operation of the motor is dependent upon the magnitude of the desired degree of motion of the said body.

The present invention provides an improved system of the type referred to above.

Figure 1:
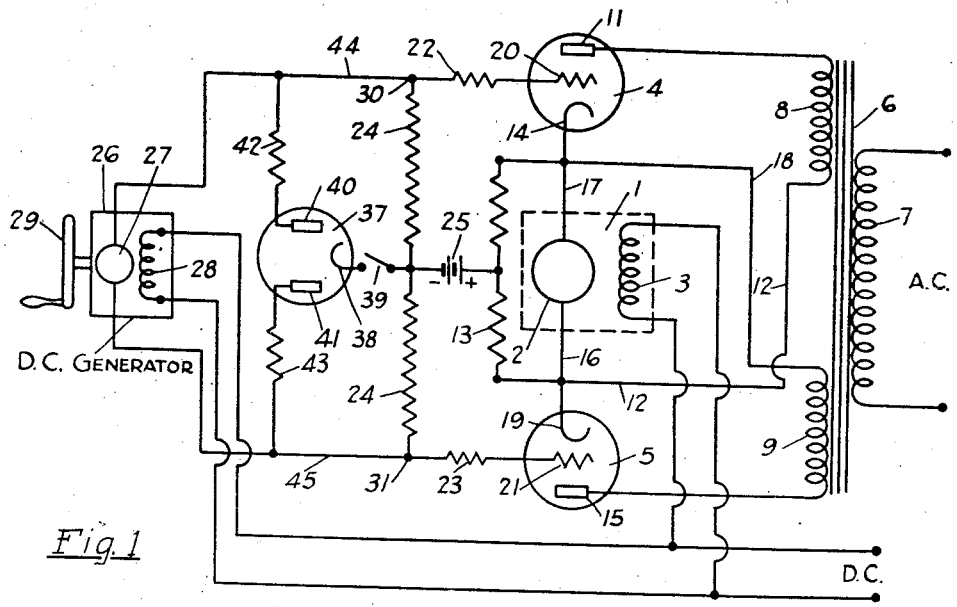
Figure 2:
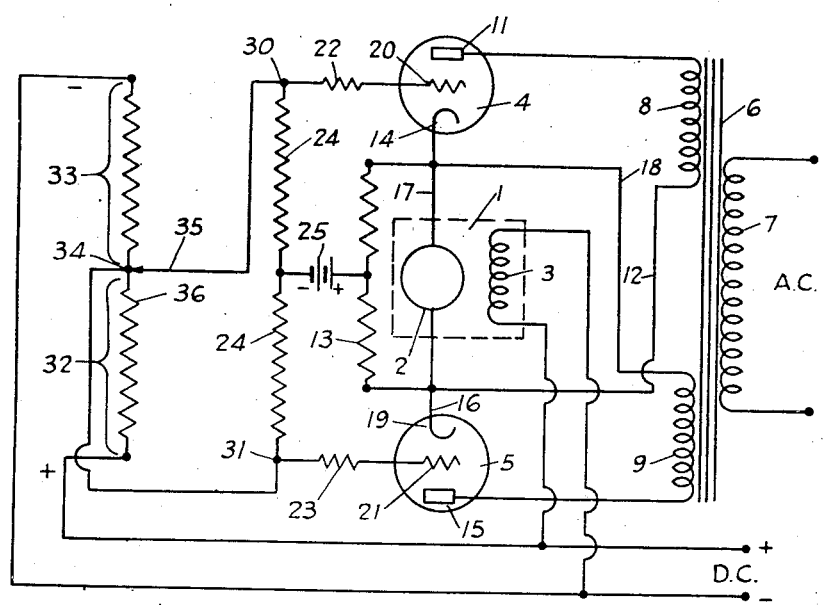
Figure 3:
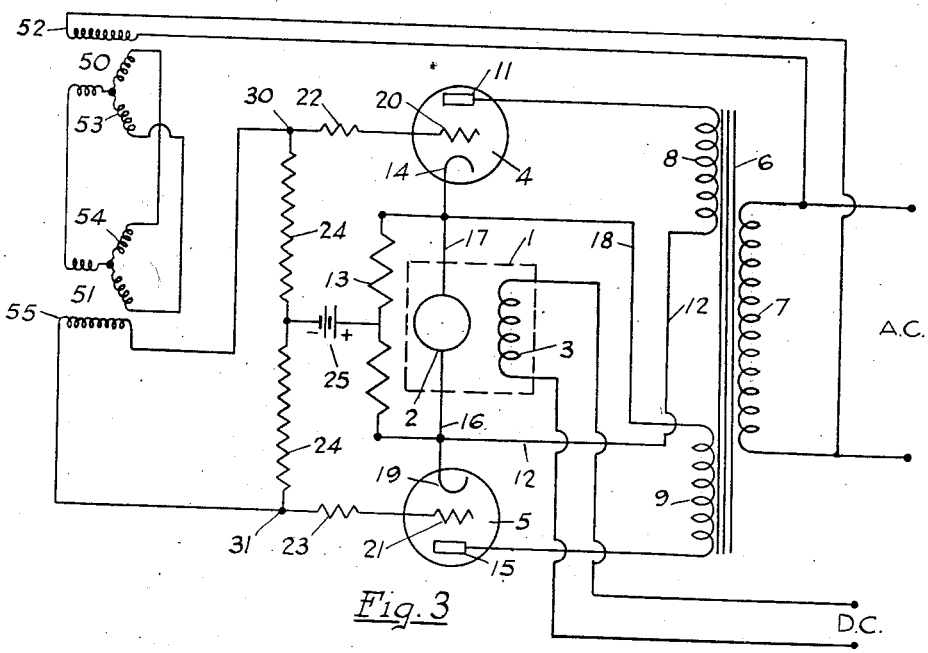
Figure 4:
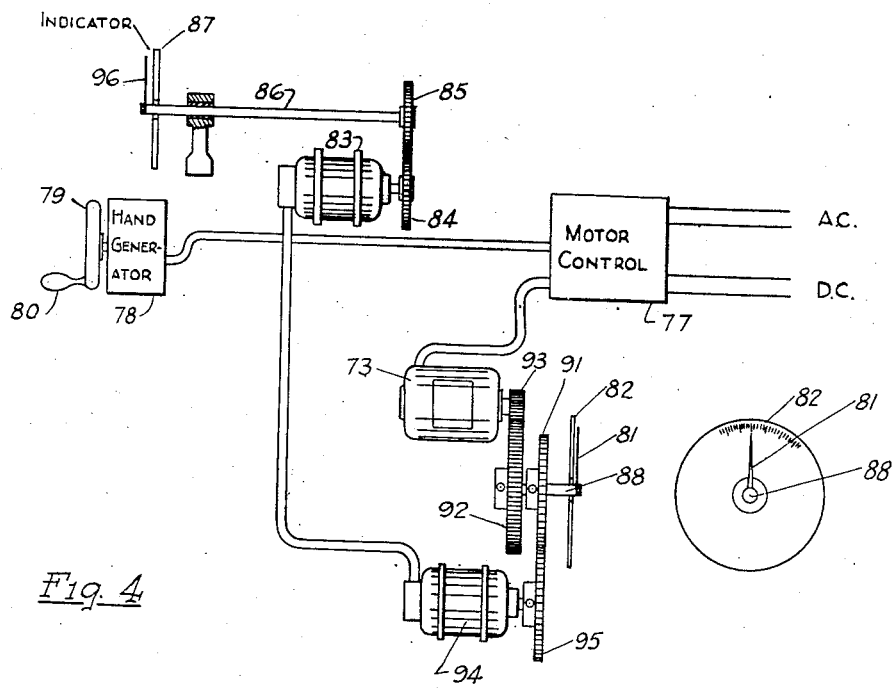

The invention will best be understood from the following description taken in connection with the accompanying drawings in which Fig. 1 is a circuit diagram of the present invention; Fig. 2 is a modification of the arrangement shown in Fig. 1; Fig. 3 is a further modification of the arrangement shown in Fig. 1; and Fig. 4 shows schematically the complete system with a pointer the orientation of which with respect to a dial is controlled by the system.

In Fig. 1 the motor 1 which is to be controlled is arranged to drive any desired mechanism (not shown). The motor is preferably of the direct current type comprising a commutator type armature 2 and a field winding 3 separately excited from the source of direct current. Two grid-controlled rectifiers 4 and 5, which are preferably of the gaseous electron discharge type, provide the motor operating current. Anode potential for the two tubes is provided by transformer 6 having a primary winding 7 connected to a source of alternating current and two secondary windings 8 and 9. The secondary winding 8 is connected by one end to the anode 11 of tube 4 and by the other end through conductors 12 and 16 to the armature 2 and from the latter by conductor 17 to the cathode 14 of tube 4. The secondary winding 9 is connected by one end to the anode 15 of the tube 5 and by the other end by conductors 18 and 17 to the armature 2 and thence by conductor 16 to the cathode 19 of the tube 5. The grids 20 and 21 of the two tubes are connected through current-limiting resistors 22 and 23, respectively, to the extremities of a center tapped resistor 24. The motor armature 2 is shunted by center tapped resistor 13, the center point of which is connected through a biasing battery 25 to the center point of the resistor 24. Potential is supplied to the resistor 24 from the armature 27 of a direct current generator 26. The grid circuit of tube 4 may thus be traced from the grid 20 through the resistor 22, the upper half of the resistor 24, the biasing battery 25 and the upper half of resistor 13 to the cathode 14. The grid circuit of tube 5 may be traced from the grid 21 through the resistor 23, the lower half of resistor 24, the biasing battery 25 and the lower half of the resistor 13 to the cathode 19.

The generator 26 may be provided with a permanent magnet field or with an electromagnetic field having a winding 28 supplied with direct current as shown. The armature 27 is mechanically connected to the handwheel 29 through suitable gearing if desired. Rotation of the handwheel 29 and consequently of the armature 27 applies a direct current potential across the resistor 24 of a value dependent upon the speed and of a polarity dependent upon the direction of rotation of the handwheel.

Under certain conditions, as will appear later, it may be desirable to provide a full wave rectifier 37 having cathode 38 connected through a switch 39 to the center point of resistor 24. The anodes 40 and 41 of tube 37 are connected to resistors 42 and 43, respectively, which are comparable in value to the halves of resistor 24. The other ends of resistors 42 and 43 are connected across the resistor 24, i. e., to the conductors 44 and 45, respectively.

The operation of the system is as follows: Considering, first, the tube 4, it will be noted that the anode circuit of the tube contains a source of alternating current and the armature 2 of the motor 1. It will also be noted that the grid circuit of the tube 4 contains three sources of potential in series, namely the drop across the upper half of the resistor 24, the biasing battery 25 and the drop across the upper half of resistor 13. The drop across the resistor 24 is due to the current flowing through it, occasioned by the potential provided by the generator 26, and varies with the speed of rotation of the handwheel 29. The potential of the biasing battery 25 is fixed at a value sufficient to inhibit conduction through the tube when maximum anode voltage is applied when the system is at rest. With some types of rectifier a biasing battery may be unnecessary. The drop across the resistor 13 is occasioned by the current flowing through it due to the back E. M. F. generated in the motor armature 2 by its rotation.

If now, it be assumed that the handwheel 29 be rotated in such a direction as to generate a potential of such polarity that the point 30 is positive and the point 31 is negative, the grid 20 will become positive thereby permitting anode current to flow through the tube 4 and the armature 2 during the half cycles of anode potential in which the anode 11 is positive with respect to its cathode. The armature 2, being immersed in the continuous magnetic field provided by the winding 3, will, therefore, commence to rotate under the influence of the rectified current impulses flowing through it. As the armature increases its speed, its back E. M. F. will build up in a direction to oppose that of the applied E. M. F. This back E. M. F. being applied across the resistor 13 causes a current to flow through this resistor which thereby introduces a potential into the grid circuit of tube 4 which opposes the potential due to the drop across the upper half of resistor 24. With a given speed of rotation of the handwheel the motor armature 2 will eventually reach such a speed that its back E. M. F. will produce across the upper half of resistor 13 a potential substantially equal to the potential drop across the upper half of resistor 24, whereby the potential of the grid 20 will be reduced to the point where no discharge will take place in the tube 4. This condition may last for one or more cycles of anode voltage until the motor armature 2 slows down sufficiently to make the difference between the voltage drop across the upper half of resistor 24 slightly greater than that across the upper half of resistor 13. The result is that the motor will be supplied with current impulses just sufficient in number to maintain its speed at a value corresponding to the speed of the generator 26. If the generator 26 be driven at a lower speed, the motor need rotate only at a lower speed to produce sufficient back E. M. F. to overcome the positive potential provided by the generator. So, likewise, if the generator be rotated at a higher speed, the motor must run at a higher speed before its supply of current impulses through the tube 4 will be cut off.

It will now be noted that while the handwheel is being turned in such a direction as to make the point 30 positive with respect to the point 31 as above discussed, the tube 5 will be inoperative since its grid 21 is maintained negative by the biasing battery 25. The potential drop across the lower half of resistor 24 likewise tends to make the grid 21 negative but this is opposed by the drop across the lower half of resistor 13 due to the current therein produced by the motor back E. M. F. Thus, for one direction of rotation of the handwheel 29 the motor armature 2 is caused to rotate in one direction by current supplied to it by the tube 4. If, now, the handwheel 29 be turned in the opposite direction, the polarity of the potential generated by the armature 27 will be reversed so that the point 31 will be positive and the point 30 negative. Under these circumstances it will be evident that the grid 21 of tube 5 will now be positive, permitting current to flow in this tube and through the armature but in the reverse direction so that the motor armature 2 will rotate in the reverse direction. Thus, the direction of rotation of the motor 1 can be controlled simply by rotating the handwheel 29 in the desired direction and the motor's speed can be controlled by varying the speed of rotation of the handwheel.

A further feature of the above system makes it possible abruptly to stop the motor 1 merely by abruptly stopping the handwheel 29 and also rapidly to reverse the direction of rotation of the motor 1 merely by rapidly reversing the direction of rotation of the handwheel. Let it be assumed that the handwheel is being operated in such a direction as to make the point 30 positive with respect to the point 31. The motor armature 2 will consequently be in rotation at a corresponding speed due to current impulses supplied by the tube 4. If, now, the handwheel 29 be abruptly stopped, the generator potential will be reduced to zero and consequently the drop across the resistor 24 will abruptly become zero. The grid 20 is then supplied by potential from the biasing battery 25 plus the drop across the upper half of resistor 13. Since both of these are negative, current through the tube 4 abruptly ceases. On the other hand, the back E. M. F. due to the motor's rotation is in such a direction as to make the drop across the lower half of resistor 13 overcome the potential of the biasing battery 25 and to make the grid 21 of the tube 5 highly positive. Current, therefore, will flow through the tube 5 causing a current to flow through the armature 2 in a direction tending to reverse its direction of rotation. However, as soon as the motor armature reaches nearly zero speed, the back E. M. F. will be insufficient to overcome the bias provided by the battery 25 and tube 5 will consequently cease supplying further current impulses to the armature 2 which therefore abruptly comes to rest. It will be obvious that if instead of stopping the handwheel 29, the operator had merely changed its direction of rotation, the motor armature 2 would not only have abruptly come to rest, but would have commenced to rotate in the reverse direction.

It sometimes happens that when one of the rectifiers 4 or 5 discharges, a discharge will also take place in the other rectifier. It is believed that this is due to some transient potentials developed in the motor armature. However, I have discovered that this effect can be eliminated by providing unidirectional current paths in shunt to the halves of resistor 24. This arrangement comprises the full wave rectifier 37 and the resistors 42 and 43 connected as above described and as shown in Fig. 1. By closing switch 38, this arrangement is connected to the circuit and simultaneous operation of both tubes 4 and 5 is thereby prevented. I therefore prefer to operate my system with this arrangement connected in the circuit, although it will operate without it. While this arrangement is not shown in Figs. 2 and 3, it will be understood, of course, that it also may be and preferably is used with the modifications therein shown.

Instead of supplying the controlling grid potential by means of a generator as shown in Fig. 1, the grid potential may be supplied by some other source, for example, by the potentiometer shown in Fig. 2. In general, the arrangement of the circuit shown in this figure is the same as that of Fig. 1, but the potential applied across the resistance 24 is supplied by the center-tapped potentiometer 36. This is connected across a source of direct current. Its center terminal 34 is connected to one end of the resistance 24 while a sliding contact 35 is connected to the other end of the resistance 24. It will be evident that when the slider 35 is at the point 34, no voltage will be applied across the resistance 24 and consequently the motor 1 will remain at rest.

When the slider 35 is moved upward along the resistance 33, the point 31 will be made positive with respect to the point 30. Tube 5 will consequently pass current to operate the motor in one direction at a speed corresponding to the position of slider 35. On the other hand, if slider 35 be moved downwards along resistance 32, the point 30 will be made positive with respect to the point 31 and the tube 4 will supply current to the motor to operate it in a reverse direction.

Fig. 3 shows a modification of my invention in which the grid control potential is alternating. The potential applied across resistor 24 is derived from the source of anode potential by means of the two self-synchronous motors 50 and 51. The device 50 has a single phase winding 52 connected to the alternating current source which supplies the anode potential. The three phase winding 53, which is rotatable relatively to 52 is connected in parallel with the corresponding winding 54 of the device 51. The single phase winding 55 of the latter is connected across the resistor 24.

If 53 be the rotor element, this may be locked in position and rotor 54 rotated in accordance with the desired speed and direction of rotation of motor 1. The voltage induced in winding 55 will be in phase with the supply potential and variable in magnitude for one direction of displacement of 54, but out of phase with the supply potential and variable in magnitude for the opposite direction of displacement. Thus, a potential variable in magnitude and in polarity with respect to the instantaneous polarity of the anode potential will be applied to resistor 24 as in the other modifications.

Instead of locking the rotor 53, the latter may be connected mechanically through suitable gearing to motor 1 or to the mechanism driven by it. Then a displacement of rotor 54 through a certain angle and in a certain direction will cause motor 1 to rotate the driven body into a corresponding position as determined by the position of rotor 53; that is the motor 1 will rotate until rotor 53 is brought into a position with respect to its stator winding 52 which corresponds to the position of rotor 54 with respect to its stator winding 51. Furthermore, the speed of operation of motor 1 will be greater for large displacements of rotor 54 than for small displacements.

The application of the system for controlling the position of a remote object such as the position of a pointer with respect to a dial is shown in Fig. 4. In this figure the device to be positioned is illustrated as a pointer 81 which is rotatable in front of a dial 82. The pointer 81 is fixed to a shaft 88 which also carries the gears 91 and 92. Gear 92 meshes with pinion gear 93 which is fixed to the shaft of the driving motor 73. The latter, of course, is controlled by one of the circuit arrangements shown in Figs. 1, 2 and 3 and shown schematically as the device 77 in Fig. 4. The device 77 is controlled by the operator by means of the hand generator 78 or other device operated by the handwheel 79. In order to indicate to the operator the position into which the remotely situated pointer 81 has been turned, a self-synchronous generator 94 is provided whose shaft carries the gear 95 meshing with gear 91. The device 94 is connected in a conventional manner to a similar device such as the self-synchronous motor 83 which carries on its shaft a gear 84 meshing with a gear 85 mounted on a shaft 86 to which an indicating pointed 96 is fixed. The position of the pointer 96 with reference to the dial 87 thus indicates to to the operator at the control station the position into which the pointer 81 has been turned at the remote station.

Having now described my invention, I claim:

1. System for controlling the rotation of a motor having an armature immersed in a continuous magnetic field comprising a pair of grid-controlled rectifiers, a transformer having two secondary windings, means for connecting one of said secondaries in series with said armature to the anode and cathode of one of said rectifiers, means for connecting the second of said secondaries in series with said armature to the anode and cathode of said second rectifier in such a manner as to pass current through the armature in the reverse direction from that of the first rectifier current, a center tapped resistor shunting said armature, a second center tapped resistor having its extremities connected to the grids of said rectifiers, respectively, and its center tap connected to the center tap of said first resistor, and means for applying a potential across said second resistor variable in magnitude and polarity to correspond with the desired speed and direction of rotation of said motor.

2. System for controlling the rotation of a motor having an armature immersed in a continuous magnetic field comprising a pair of grid-controlled rectifiers, a transformer having two secondary windings, means for connecting one of said secondaries in series with said armature to the anode and cathode of one of said rectifiers, means for connecting the second of said secondaries in series with said armature to the anode and cathode of said second rectifier in such a manner as to pass current through the armature in the reverse direction from that of the first rectifier current, a center tapped resistor shunting said armature, a second center tapped resistor having its extremities connected to the grids of said rectifiers, respectively, a source of potential having its positive terminal connected to the center tap of said first resistor and its negative terminal connected to the center tap of said second resistor and adapted to provide sufficient negative grid potential to prevent discharge of said rectifiers when maximum anode potential but no other grid-control potential is applied, and means for applying grid-control potential across the second resistor of a magnitude and polarity corresponding with the desired speed and direction of rotation of said motor.

3. A system for controlling the rotation of a motor having an armature, a pair of grid-controlled rectifiers, circuit connections between said rectifiers and said armature adapted to pass the current from one rectifier through the armature in one direction and the current from the other rectifier through the armature in a reverse direction, means for applying a potential to the grids of said rectifiers of a magnitude and polarity corresponding to the desired speed and direction of rotation, respectively, of said motor, said means including a manually operated direct current generator and means for opposing said potential with a potential varying in polarity and magnitude in proportion to the motor speed.

4. A system for controlling the rotation of a motor having an armature, a pair of grid-controlled rectifiers, circuit connections between said rectifiers and said armature adapted to pass the current from one rectifier through the armature in one direction and the current from the other rectifier through the armature in a reverse direction, means for applying a potential to the grids of said rectifiers of a magnitude and polarity corresponding to the desired speed and direction of rotation, respectively, of said motor, said means including a manually operated direct current generator and means for opposing said potential with the back E. M. F. of said motor.

5. A system for controlling the rotation of a motor having an armature, a pair of grid-controlled rectifiers, circuit connections between said rectifiers and said armature adapted to pass the current from one rectifier through the armature in one direction and the current from the other rectifier through the armature in a reverse direction, means for applying a potential to the grids of said rectifiers of a magnitude and polarity corresponding to the desired speed and direction of rotation, respectively, of said motor, said means including a potentiometer providing potential of variable magnitude and polarity and means for opposing said potential with a potential varying in polarity and magnitude in proportion to the motor speed.

6. A system for controlling the rotation of a motor having an armature, a pair of grid-controlled rectifiers, circuit connections between said rectifiers and said armature adapted to pass the current from one rectifier through the armature in one direction and the current from the other rectifier through the armature in a reverse direction, means for applying a potential to the grids of said rectifiers of a magnitude and polarity corresponding to the desired speed and direction of rotation, respectively, of said motor, said means including a potentiometer providing potential of variable magnitude and polarity and means for opposing said potential with the back E. M. F. of said motor.

7. A system for controlling the rotation of a motor having an armature, a pair of grid-controlled rectifiers, circuit connections between said rectifiers and said armature adapted to pass the current from one rectifier through the armature in one direction and the current from the other rectifier through the armature in a reverse direction, means for applying a potential to the grids of said rectifiers of a magnitude and polarity corresponding to the desired speed and direction of rotation, respectively, of said motor, a center tapped resistor having its extremities connected to the grids of said rectifiers, respectively, and its center tap connected to the cathodes of said rectifiers, means for applying a potential variable in magnitude and polarity corresponding to the desired speed and direction of motion of said motor across said resistor and means for applying a potential corresponding at all times to the back E. M. F. of said motor in a series-opposed relation in the grid cathode circuit of each of said rectifiers.

8. System for controlling from a proximate point the rotation of a body at a remote point comprising means at the proximate point for generating a potential corresponding in magnitude to the desired speed of rotation of said body and corresponding in polarity to the desired direction of rotation of said body, a motor having an armature at said remote point for rotating said body, means for supplying operating current to said motor armature including a pair of grid-controlled rectifiers and means for applying said generated potential to the control grids of said rectifiers in such a manner that one of said rectifiers will pass current for one polarity of said generated potential and the other of said rectifiers will pass current for the opposite polarity of said generated potential, said means including a source of potential varying in polarity and magnitude with the direction and speed of rotation of the motor, two center-tapped resistors, one connected across said last-named source of potential, the other connected across the source of said generated potential, each of the two halves of one resistor being connected in series opposition to a corresponding half of the second resistor and each series combination so formed being connected between the grid and cathode of one of said rectifiers respectively.

9. A system for controlling the rotation of a motor having an armature, a pair of grid-controlled rectifiers, circuit connections between said rectifiers and said armature adapted to pass the current from one rectifier through the armature in one direction and the current from the other rectifier through the armature in a reverse direction, means for applying a potential to the grids of said rectifiers of a magnitude and polarity corresponding to the desired speed and direction of rotation, respectively, of said motor, a center tapped resistor having its extremities connected to the grids of said rectifiers, respectively, and its center tap connected to the cathodes of said rectifiers, means for applying a potential variable in magnitude and polarity corresponding to the desired speed and direction of motion of said motor across said resistor, a full wave rectifier having cathode and two anodes, two resistors each of substantially the same magnitude as one half of said first resistor, said full-wave rectifier cathode being connected to the center tap of said first resistor and each of said full-wave rectifier anodes being connected in series with one of said last-mentioned resistors, one to one extremity and the other to the other extremity of said center tapped resistor and means for applying a potential corresponding at all times to the back E. M. F. of said motor in a series-opposed relation in the grid cathode circuit of each of said rectifiers.

10. System for controlling from a proximate point the rotation of a body at a remote point comprising means at the proximate point for generating a potential corresponding in magnitude to the desired speed of rotation of said body and corresponding in instantaneous polarity, with respect to the instantaneous polarity of the available alternating current supply, to the desired direction of rotation of said body, a motor having an armature at said remote point for rotating said body, means for supplying operating current to said motor armature including a pair of grid-controlled rectifiers and means for applying said generated potential to the control grids of said rectifiers in such a manner that one of said rectifiers will pass current for one polarity of said generated potential and the other of said rectifiers will pass current for the opposite polarity of said generated potential, said means including a source of potential varying in polarity and magnitude with the direction and speed of rotation of the motor, two center-tapped resistors, one connected across said last-named source of potential, the other connected across the source of said generated potential, each of the two halves of one resistor being connected in series opposition to a corresponding half of the second resistor and each series combination so formed being connected between the grid and cathode of one of said rectifiers respectively.

11. A system for controlling the rotation of a motor having an armature, a pair of grid-controlled rectifiers, circuit connections between said rectifiers and said armature adapted to pass the current from one rectifier through the armature in one direction and the current from the other rectifier through the armature in a reverse direction, means for applying a potential to the grids of said rectifiers of a magnitude and polarity corresponding to the desired speed and direction of rotation, respectively, of said motor, a center tapped resistor having its extremities connected to the grids of said rectifiers, respectively, and its center tap connected to the cathodes of said rectifiers, means for applying a potential variable in magnitude and polarity corresponding to the desired speed and direction of motion of said motor across said resistor, a full wave rectifier having cathode and two anodes, two resistors, said full-wave rectifier cathode being connected to the center tap of said first resistor and each of said full-wave rectifier anodes being connected in series with one of said last-mentioned resistors, one to one extremity and the other to the other extremity of said center tapped resistor and means for applying a potential corresponding at all times to the back E. M. F. of said motor in a series-opposed relation in the grid cathode circuit of each of said rectifiers.

12. A system for controlling the rotation of a motor having an armature comprising means providing a potential variable to correspond in magnitude to the desired speed of rotation of the motor and to correspond in polarity to the desired direction of rotation of the motor, means for supplying operating current to said motor armature including a pair of grid-controlled rectifiers and means for applying said variable potential to the control grids of said rectifiers in such a manner that one of said rectifiers will pass current for one polarity of said variable potential and the other of said rectifiers will pass current for the opposite polarity of said variable potential, said means including a source of potential varying in polarity and magnitude with the direction and speed of rotation of the motor, two center-tapped resistors, one connected across said last-named source of potential, the other connected across the source of said variable potential, each of the two halves of one resistor being connected in series opposition to a corresponding half of the second resistor and each series combination so formed being connected between the grid and cathode of one of said rectifiers respectively.

HOWARD A. SATTERLEE.